United States Patent [19]

Amon et al.

[11] Patent Number: 4,599,111

[45] Date of Patent: Jul. 8, 1986

[54] DESENSITIZING INK FOR WET OFFSET PRINTING

[75] Inventors: Albert Amon; Roger Weil, both of Lausanne, Switzerland

[73] Assignee: Sicpa Holding S.A., Switzerland

[21] Appl. No.: 668,379

[22] PCT Filed: Mar. 12, 1984

[86] PCT No.: PCT/EP84/00122

§ 371 Date: Oct. 24, 1984

§ 102(e) Date: Oct. 24, 1984

[87] PCT Pub. No.: WO84/03663

PCT Pub. Date: Sep. 27, 1984

[30] Foreign Application Priority Data

Mar. 16, 1983 [CH] Switzerland ........................ 1443/83

[51] Int. Cl.[4] ............................................. C09D 11/00

[52] U.S. Cl. ....................................... 106/21; 106/27; 346/205; 427/150; 427/152; 428/423.1

[58] Field of Search .................... 106/21, 27; 346/205; 427/150, 152; 428/423.1

[56] References Cited

FOREIGN PATENT DOCUMENTS

| | | |
|---|---|---|
| 1433469 | 4/1976 | United Kingdom . |
| 1525269 | 9/1978 | United Kingdom . |
| 2032932 | 5/1980 | United Kingdom . |

OTHER PUBLICATIONS

Derwent Abstract, Accession No. 79-36543B/19, U.S.S.R. Patent, Dec. 8, 1978.

Japanese Patent Abstract, vol. 6, No. 89, May 27, 1982, see p. M-132 (967).

*Primary Examiner*—Amelia B. Yarbrough
*Attorney, Agent, or Firm*—Anthony A. O'Brien

[57] ABSTRACT

A nucleophilic alkoxylated compound is bridged as a polyurethane by a polyisocyanate derivative or as a polyester by a polyacid derivative. A desensitizing ink for wet offset printing on an acceptor surface of a chemical duplicating set is thus obtained.

8 Claims, No Drawings

DESENSITIZING INK FOR WET OFFSET PRINTING

The invention relates to a desensitizing ink for wet offset printing on an acceptor surface of a chemical duplicating set comprising at least two superposed sheets, one of the facing surfaces of which has an electrophilic acceptor coating and the other a nucleophilic coating capable of producing a chromogenic reaction with said electrophilic acceptor coating.

According to the British Pat. No. 1,433,469, desensitizing inks are already known that contain polypropyleneglycol with a molecular weight between 400 and 5,000, making it possible to print in letterpress, flexography or gravure on the acceptor surface of a duplicating set, and thus to prevent any color formation in the areas thus printed when a subsequent writing or typing is performed on the duplicating set.

As mentioned in the British Pat No. 1,525,269, the holde of British Pat. No. 1,433,469 did not succeed in formulating a desensitizing ink based on polyalkyleneglycol making it possible to print in wet offset the acceptor surface of a chemical duplicating set.

As described in Swiss Pat. No. 628,288, the holder of the present invention has worked out a desensitizing ink based on polyalkylene glycol or other nucleophilic alkoxylated compounds of high molecular weight, making it possible to print the acceptor surface of a chemical duplicating set by wet offset printing, following an alkoxylation to such a degree that their hydrophilic lipophilic balance (HLB) is between 2 and 9 in order to allow on the one hand, a continuous ink transfer from the inking rollers to the hydrophobic areas of the wetted printing plate of an offset press, and on the other hand, to desensitize the corresponding areas of the acceptor surface of the chemical duplicating set.

In order to increase the molecular weight of the desensitizing compound, the ink, according to the invention, is characterized in that the nucleophilic alkoxylated compound is bridged by an aliphatic or aromatic polyisocyanate derivative or again by an aliphatic or aromatic polyacid derivative which further makes it possible to improve the transfer of the ink on the inking rollers of the wet offset press. As a result, an ink flow of constant thickness is produced by the inking rollers. This ink film withstands particularly well the resulting impact on the emulsion of the dampening water in the ink, before being transferred successively to the offset printing plate then to the blanket and finally as a desensitizing ink layer, at a rate of 1.5-5 g/m2, on a paper support.

According to the invention, a desensitizing ink for wet offset printing of the acceptor surface of a chemical duplicating set, can be formulated the following way:

EXAMPLE 1

On a 3 roll mill, 70 parts of a varnish obtained by the reaction of 63 parts of polypropylene glycol (M.W. 2,500) with 5 parts of hexamethylene triisocyanate and the addition of 32 parts of an acid modified phenolic resin are mixed with 13 parts of titanium dioxide, 1 part of silicon oxide and 6 parts of calcium carbonate.

12 parts of the alkoxylated derivative are added to the ground ink. The HLB value of the ink amount to 3 ($\pm$1). This ink shows a suitable reheology for wet offset printing.

EXAMPLE 2

On a 3 roll mill, 68 parts of a varnish obtained by the reaction of 66 parts of propoxylated diethylene triamine (M.W. 2,500) with 9 parts of trimethylol propane treated with 3 moles of toluyl diisocyanate and the addition of 25 parts of an acid modified phenolic resin are mixed with 12 parts of titanium dioxide, 2 parts of silicon oxide and 6 parts of calcium carbonate.

12 parts of the alkoxylated derivative are added to the ground ink. The HLB value of the ink amounts to 4 ($\pm$1). This ink shows a suitable rheology for wet offset printing.

EXAMPLE 3

On a 3 roll mill, 60 parts of a varnish obtained by the reaction of 58 parts of polypropylene glycol (M.W. 2,500) with 8 parts of ricinoleic acid, 10 parts of trimethylol propane treated with 3 moles of toluyl diisocyanate and the addition of 24 parts of a neutral esterified collophony resin are mixed with 20 parts of titanium dioxide, 2 parts of silicon oxide and 6 parts of calcium carbonate.

12 parts of the alkoxylated derivative are added to the ground ink. The HLB value of the ink amounts to 3 ($\pm$1). This ink shows a suitable rheology for wet offset printing.

EXAMPLE 4

On a 3 roll mill, 60 parts of a varnish obtained by the reaction of 72 parts of propoxylated diethylene triamine (M.W. 2,500) with 5 parts of castor oil, 5 parts of hexamethylene triisocyanate and the addition of 18 parts of neutral esterfied collophony resin are mixed with 20 parts of titanium dioxide, 2 parts of silicon oxide and 6 parts of calcium carbonate.

12 parts of the alkoxylated derivative are added to the ground ink. The HLB value of the ink amounts to 4 ($\pm$1). This ink shows a suitable rheology for wet offset printing.

EXAMPLE 5

On a 3 roll mill, 68 parts of a varnish obtained by the reaction of 75 parts of polypropyleneglycol (M.W. 2,500) with 5 parts of a long oil alkyd, 5 parts of hexamethylene triisocyanate and the addition of 15 parts of an acid modified phenolic resin are mixed with 12 parts of titanium dioxide, 2 parts of silicon oxide and 6 parts of calcium carbonate.

12 parts of the alkoxylated derivative are added to the ground ink. The HLB value of the ink amounts to 3 ($\pm$1). This ink shows a suitable rheology for wet offset printing.

In the desensitizing ink formulated as in Examples 3, 4, and 5, a substitution has been made with either a fatty acid containing hydroxyl groups (Example 3), or a fatty oil (Example 4) or a long oil alkyd (Example 5), for a part of the nucleophilic alkoxylated compound, which makes it possible to increase the viscosity of the ink.

A stoichimometric amount of diacid can be reacted with the alkoxylated derivative which can be written HO (R) OH; a polyester is obtained in the presence of p-toluene-sulfonic acid as the catalyst. As the reaction temperature is over 100° C., the ester formation is accompanied by losing water which can be collected in a Dean-Starke column. The product increases molecular weight which is reflected by an increase in viscosity.

EXAMPLE 6

96 parts of polypropyleneglycol are reacted with 4 parts of succinic acid at a temperature above 100° C. in the presence of 0.2 parts of p-toluene sulfonic acid and a succinic polyester is obtained. 35 parts of an acid modified phenolic resin are added under stirring to 65 parts of the succinic polyester and the mixture is heated to the complete solubilization of the resin. This varnish shows 120 poises of viscosity (Measured on a Haake cone-plate viscosimeter at 25° C.

On a 3 roll mill, 70 parts of this polyester varnish is mixed with 10 parts of titanium dioxide, 2 parts of silicon oxide, 6 parts of calcium carbonate and 10 parts of the liquid succinic polyester.

The ink exhibits very good desensitizing properties, a good hydrophiliclipophilic balance (HLB) of 4 (±1), a viscosity of 120 poises and initial tack of 150 units (measured on a Tack-O-Scope of Testprint at a speed of 100 m/min at 25° C.) and a good transfer on the inking rollers.

EXAMPLE 7

94 parts of polypropylene glycol are reacted with 6 parts of citric acid at a temperature above 100° C. in the presence of 0.2 parts of p-toluene sulfonic acid and a citric polyester is obtained.

38 parts of an acid modified phenolic resin are added under stirring to 68 parts of the citric polyester and the mixture is heated to the complete solubilization of the resin. The varnish thus obtained has a viscosity of 140 poises at 25° C.

On a 3 roll mill, 67 parts of the polyester varnish are mixed with 12 parts of titanium dioxide, 2 parts of silicon acid, 6 parts of calcium carbonate and 13 parts of the liquid citric polyester.

The ink thus obtained exhibits very good wet offset desensitizing properties, (HLB: 4 (±1), a viscosity of 110 poises at 25° C. and initial tack of 155 units.

As a varition, synthesis of a polyester can be done with an aromatic polyacid, such as isophthalic or terephthalic acid.

As an other variation, synthesis of polyester can be done starting with the propoxylated diethylene triamine of similar molecular weight.

Still another varition can be the substitution of part of the aliphatic or aromatic polyacid by:

either fatty acids, such as ricinoleic acid, oleic acid etc. or fatty oils which react around 250° C. by transesterification or with fatty alkyds containing acid groups.

In order to make the wetting of the hydrophilic areas of the wet offset printing plate easier, a portion of all of the water required to insure the saturation of these areas can be emulsified in the ink mass.

We claim:

1. A densensitizing ink for wet offset priting on an acceptor surface of a chemical duplicating set comprising a nucleophilic alkoxylated compound, characterized in that the nucleophilic alkoxylated compound is bridged as a polyurethane in order to increase its molecular weight and improve the ink transfer on the inking rollers.

2. A desensitizing ink as in claim 1, characterized in that the nucleophilic alkoxylated compound is bridged as a polyurethane by an aliphatic or aromatic polyisocyanate derivative.

3. A densensitizing ink as in claim 1, characterized in that it contains emulsified water in the ink mass.

4. A densensitizing ink as in claim 3, characterized in that the amount of the emulsified water in the ink mass is sufficient for partial wetting of the hydrophilic areas of a wet offset printing plate.

5. A desensitizing ink as in claim 3, characterized in that the amount of emulsified water in the ink mass is sufficient to insure optimum saturation of the hydrophilic areas of a wet offset printing plate.

6. A desensitizing ink as in claim 2, characterized in that a part of the nucleophilic alkoxylated compound is substituted by a fatty acid containing at least one hydroxyl group, the nucleophilic alkoxylated compound and the fatty acid being bridged as a polyurethane by an aliphatic or aromatic polyisocyanate derivative.

7. A desensitizing ink as in claim 2, characterized in that a part of the nucleophilic alkoxylated compound is substituted by a fatty oil containing at least one hydroxyl group, the nucleophilic alkoxylated compound and the fatty oil being bridged as a polyurethane by an aliphatic or aromatic polyisocyanate derivative.

8. A desensitizing ink as in claim 2, characterized in that a part of the nucleophilic alkoxylated compound is substituted by a long oil alkyd containing at least one hydroxyl group, the nucleophilic alkoxylated compound and the long oil alkyd being bridged as a polyurethane by an aliphatic or aromatic polyisocyanate derivative.

* * * * *